(12) United States Patent
Donovan et al.

(10) Patent No.: US 11,394,092 B1
(45) Date of Patent: Jul. 19, 2022

(54) CRASH SAFE BATTERY PACK FOR MEDIATING RISKS OF ELECTRICAL SHORT CIRCUITS DURING IMPACT

(71) Applicant: BETA AIR, LLC, South Burlington, VT (US)

(72) Inventors: Sean Richard Donovan, Richmond, VT (US); Sam Wagner, Westford, VT (US); Peter Adam Gottlieb, Wayland, MA (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/319,182

(22) Filed: May 13, 2021

(51) Int. Cl.
*H01M 50/249* (2021.01)
*H01M 50/209* (2021.01)
*H01M 50/242* (2021.01)
*H01M 50/579* (2021.01)

(52) U.S. Cl.
CPC ....... *H01M 50/579* (2021.01); *H01M 50/209* (2021.01); *H01M 50/242* (2021.01); *H01M 50/249* (2021.01); *H01M 2220/20* (2013.01)

(58) Field of Classification Search
CPC ............. H01M 50/579; H01M 50/209; H01M 50/242; H01M 50/249; H01M 2220/20
See application file for complete search history.

(56) References Cited

U.S. PATENT DOCUMENTS

| 5,609,972 | A | 3/1997 | Kaschmitter | |
|---|---|---|---|---|
| 5,741,606 | A | 4/1998 | Mayer | |
| 7,923,144 | B2 | 4/2011 | Kohn | |
| 8,884,459 | B2 | 11/2014 | Smith | |
| 9,517,686 | B1 | 12/2016 | Saravanan | |
| 2012/0002338 | A1* | 1/2012 | Smith | H01M 10/625 361/116 |
| 2013/0269842 | A1* | 10/2013 | Seki | H01M 4/662 148/691 |
| 2018/0053922 | A1* | 2/2018 | Van Roon | H01M 50/267 |
| 2020/0091468 | A1 | 3/2020 | Wong | |
| 2020/0152950 | A1* | 5/2020 | Rodriguez | H01M 50/502 |
| 2020/0212405 | A1 | 7/2020 | Wong | |
| 2020/0328399 | A1 | 10/2020 | Jiang | |
| 2020/0350532 | A1* | 11/2020 | Kaiser | B60L 50/64 |

FOREIGN PATENT DOCUMENTS

| DE | 102017129845 A | 6/2018 |
|---|---|---|
| EP | 3357108 | 8/2018 |
| WO | 2013022399 | 2/2013 |
| WO | 2020048155 | 3/2020 |

OTHER PUBLICATIONS

Retrieved from: https://www.nrc.gov/docs/ML1719/ML17192A237.pdf Title: Lithium-Ion Batteries Hazard and Use Assessment Date: Jul. 2011 By: Celina Mikolajczak, PE.

* cited by examiner

*Primary Examiner* — Muhammad S Siddiquee
(74) *Attorney, Agent, or Firm* — Caldwell Intellectual Property Law

(57) ABSTRACT

Aspects relate to systems and methods of use for a crash safe battery pack that includes a case, a first battery module located within the case and mounted to the case with at least a breakaway mount, a second battery module located within the case, a frangible connection configured to provide electrical conduction between the first battery module and the second battery module, and a die configured to contact and separate the frangible connection when the crash safe battery pack is impacted with a sufficiently great connection breaking force.

11 Claims, 7 Drawing Sheets

CRASH SAFE BATTERY PACK FOR MEDIATING RISKS OF ELECTRICAL SHORT CIRCUITS DURING IMPACT

FIELD OF THE INVENTION

The present invention generally relates to the field of thermoelectric and photoelectric batteries. In particular, the present invention is directed to a crash safe battery pack for mediating risks of thermal runaway during impact.

BACKGROUND

Presently, battery packs used within electric vehicles, such as electric aerial vehicles, are at risk of experiencing thermal runaway upon impact. Specifically, battery packs, which typically employ many modules, upon impact can experience a short circuit, causing high current and resulting in a temperature rise. When the temperature of the battery pack rises about a threshold, for example the melting point of metallic lithium in the case of a lithium-ion battery, thermal runaway occurs. Thermal runaway of batteries can result in fire, explosion, and toxic gas emission.

SUMMARY OF THE DISCLOSURE

In an aspect, a crash safe battery pack includes a case having a battery storage zone and a crush zone, a first battery module located within the battery storage zone of the case and mounted to the case with at least a breakaway mount, a second battery module located within the battery storage zone of the case and mounted to the case, a frangible connection located substantially within the crush zone between the first battery module and the second battery modules and configured to provide electrical conduction between the first battery module and the second battery module, and a die located substantially within the crush zone and configured to contact and separate the frangible connection when the crash safe battery pack is impacted with a sufficiently great connection breaking force.

In another aspect, a method of assembly for a crash safe battery pack includes locating a first battery within a battery storage zone of a case having the battery storage zone and a crush zone, mounting the first battery module to the case with at least a breakaway mount, locating and mounting a second battery module within the battery storage zone of the case, providing electrical conduction electricity between the first battery module and the second battery module using a frangible connection located substantially within the crush zone, and contacting and separating the frangible connection using a die located substantially within the crush zone, when the crash safe battery pack is impacted with a sufficiently great connection breaking force.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for preventing thermal runaway of a multicell battery during an impact. In an embodiment, electrical connections between cells within a battery are designed to be broken during an impact. Battery cells may be connected to one another in series, thereby increasing total potential (voltage) of battery pack. As a result of increased total voltage, a short circuit, for instance occurring as a result of an impact, may result in increased current flow. With increased current flow battery cells may be more likely to heat beyond a safe temperature range, and thereby experience thermal runaway.

Aspects of the present disclosure can be used to thermal runaway by disconnecting battery cells at time of impact, thereby reducing total potential of battery pack. Aspects of the present disclosure can also be used to reduce a likelihood of a short circuit situation during an impact. This is so, at least in part, because by breaking an electrical bus which connects one or more battery cells a length of the electrical bus, which can be short circuited may be reduced, as well as total potential within the electrical bus.

Aspects of the present disclosure allow for electric vehicles, especially electric air vehicles, to benefit from a reduced risk of catastrophic damage (for example by way of thermal runaway) during an impact, such as a crash or hard landing. Exemplary embodiments illustrating aspects of the present disclosure are described below in the context of several specific examples.

Figure 1:
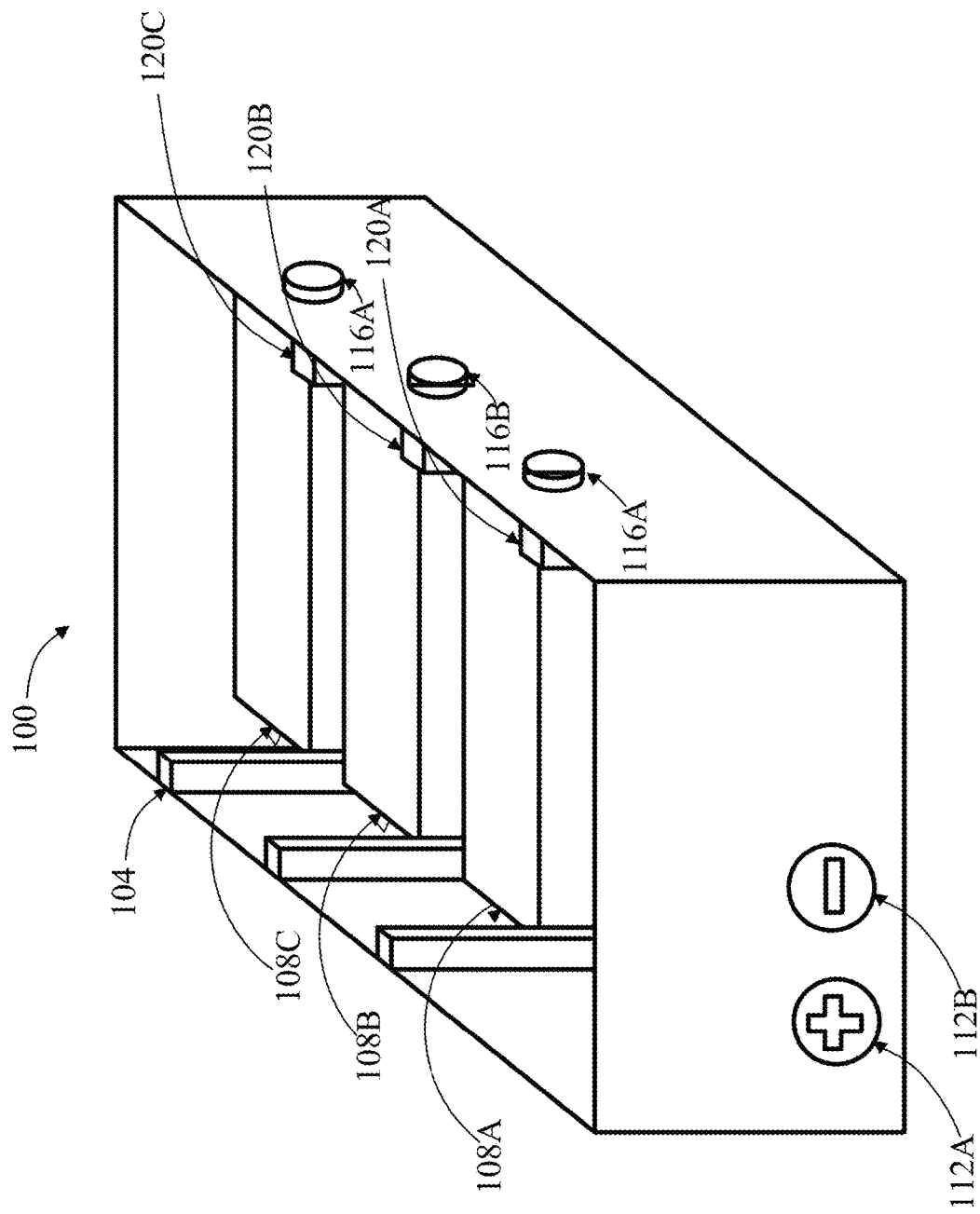
FIG. 1 is a schematic diagram of an exemplary crash safe battery pack.

Referring now to the drawings, FIG. 1 illustrates an exemplary battery pack 100. According to some embodiments, a battery pack 100 includes an outer case 104. In some cases, case 104 may be made from metal for example one or more of sheet metal, stamped metal, extruded metal, and/or machined metal. In some cases, case 104 may be held together by one or more fasteners (e.g., sheet metal screws, machine screws, threaded inserts, snaps, and the like). Alternatively or additionally, in some cases, case 104 may be formed by way of welding, brazing, and/or soldering. In some cases, case 104 may include a relatively light and strong metal, for instance aluminum alloy. As shown in FIG. 1, case 104, may comprise an outer case, which substantially encloses a plurality of battery modules 108A-C. Alternatively or additionally, case 104 may only partially enclose plurality of battery modules 108A-C, for instance as with an exoskeleton-like case or where the case includes an internal frame. Battery modules 108A0C may include any battery modules or battery cells described throughout this disclosure, for instance without limitation those described below. In some instances, battery modules 108A-C may be connected in series to one another, such that a total potential for the connected battery modules together is greater than a potential for any one of the battery modules (e.g., 108A). In some cases, a shared electrical connection from plurality of modules 108A-C may be accessible by way of a connector 112A-B. In some cases, connector 112A-B may have a polarity and include a positive connection 112A and a negative connection 112B. In some cases, one or more battery modules of plurality of battery modules 108A-C may be mounted to case 104 by way of at least a breakaway mount 116A-C. In some embodiments, a breakaway mount may include any means for attachment that is configured to disconnect under a predetermined load. In some cases, breakaway mounts may be passive and rely upon loading forces for disconnection, for instance non-limiting exemplary breakaway mounts may include one or more of a shear pin, a frangible nut, a frangible bolt, a breakaway nut, bolt, or stud, and the like. In some cases, a passive breakaway mount includes a relatively soft or brittle material (e.g., plastic) which is easily broken under achievable loads. Alternatively or additionally, a breakaway mount may include a notch, a score line, a perforation, or another weakening feature purposefully introduced to the breakaway mount to introduce breaking at a prescribed load. According to some embodiments, a canted coil spring may be used to as part of a breakaway mount, to ensure that the mount disconnects under a predetermined loading condition. In some cases a mount may comprise a canted coil spring, a housing, and a piston; and sizes and profiles of the housing and the piston may be selected in order to prescribe a force required to disconnect the mount. An exemplary canted coil spring may be provided by Bal-Seal Engineering, Inc. of Foothill Ranch, Calif., U.S.A. Alternatively or additionally, a breakaway mount may include an active feature which is configured to actively disconnect a mount under a prescribed condition (for instance a rapid change in elevation or large measured G-forces). Much like an airbag that is configured to activate during a crash, an active mount may be configured to actively disconnect during a sensed crash. An active mount may, in some cases, include one or more of an explosive bolt, an explosive nut, an electro-magnetic connection, and the like. In some cases, one or more breakaway mounts 116A-C may be configured to disconnect under a certain loading condition, for instance a force in excess of a predetermined threshold (i.e., battery breakaway force) acting substantially along (e.g., within about +/−45°) a predetermined direction. Non-limiting exemplary battery breakaway forces may include forces resulting from decelerations, including impulsive impact derived decelerations, in excess of 4, 12, 20, 50, or 100 G's. In some embodiments, a case 104 may include a battery storage zone, for instance within which battery modules 108A-C are located, and a crush zone. Typically, crush zone may be located between one or more battery modules 108A-C and an inner wall of case 104. In some embodiments, crush zone may be substantially empty. Alternatively, in some other embodiments, crush zone may comprise some material, for instance without limitation a compressible material. In some cases, compressible material may be configured to absorb and/or dissipate energy as it is compressed. In some cases, compressible material may include a material having a number of voids, for instance compressible material may take a form of a honeycomb or another predictably cellular form. Alternatively or additionally, compressible material may include a non-uniform material, such as without limitation a foam. In some embodiments, a crush zone may be located down from one or more battery modules 108A-C substantially along a loading direction, such that for instance the one or more battery modules when disconnected from one or more breakaway mounts 116A-C are directed toward crush zone. In some cases, case 104 may include one or more channels or guides 120A-C that are configured to direct at least a battery module 108A-C into a crush zone, should it become disconnected from the case.

Still referring to FIG. 1, as used in this disclosure "battery module" is any potential energy storage component, such as a storage component of electrical or chemical energy. In some embodiments, battery module 108A-C may include Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon, tin nanocrystals, graphite, graphene or titanate anode, or the like. Batteries and/or battery modules may include without limitation batteries using nickel-based chemistries such as nickel cadmium or nickel metal hydride, batteries using lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), batteries using lithium polymer technology, metal-air batteries. Battery modules 108A-C may include lead-based batteries such as without limitation lead acid batteries and lead carbon batteries. Battery modules 108A-C may include lithium sulfur batteries, magnesium ion batteries, and/or sodium ion batteries. Batteries may include solid state batteries or supercapacitors or another suitable energy source. Batteries may be primary or secondary or a combination of both. Additional disclosure related to batteries and battery modules may be found in co-owned U.S. Patent Applications entitled "SYSTEM AND METHOD FOR HIGH ENERGY DENSITY BATTERY MODULE" and "SYSTEMS AND METHODS FOR RESTRICTING POWER TO A LOAD TO PREVENT ENGAGING CIRCUIT PROTECTION DEVICE FOR AN AIRCRAFT," having U.S. patent application Ser. Nos. 16/948,140 and 16/590,496 respectively; the entirety of both applications are incorporated herein by reference. Persons skilled in the art, upon reviewing the entirety of this disclosure, will be aware of various devices of components that may be used as a battery module. In some cases, electrical communication amongst plurality of battery modules 108A-C is made with at least a frangible connection.

Figure 2:
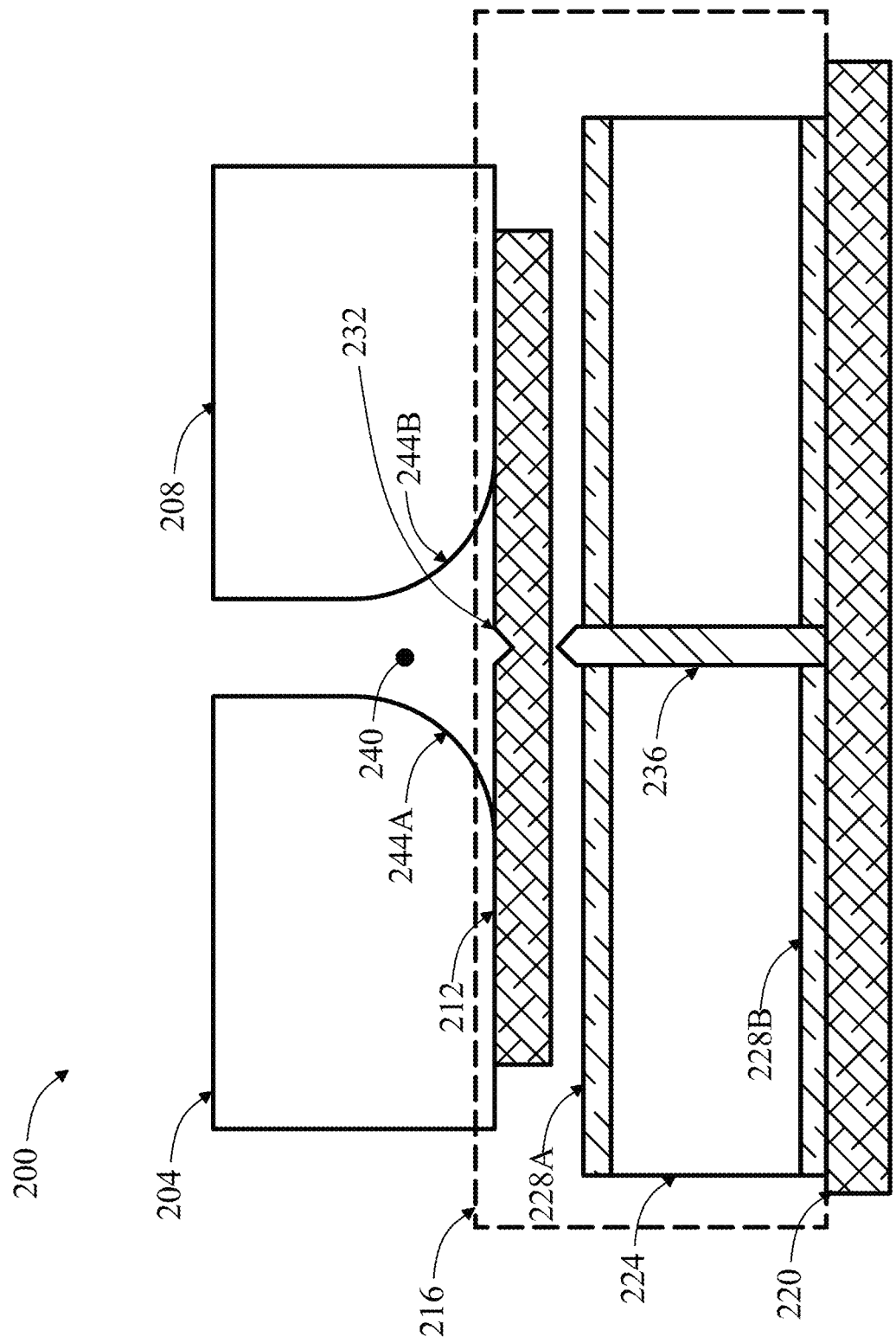
FIG. 2 is a schematic diagram of an exemplary frangible connection in an unbroken state.

Referring now to FIG. 2, an exemplary frangible connection mechanism 200 is schematically shown. As used in this disclosure "frangible" is an attributive which refers to a components tendency to break apart (i.e., disintegrate or shatter) or yield on impact or under predetermined loading. In some embodiments, a frangible material may break apart or yield on impact in order to limit potential hazards (i.e., to fail safe). A first battery module 204 is shown in electrical connection with a second battery module 208, where electrical connection is provided by way of a frangible connection 212 (i.e., frangible bus). In some cases, frangible connection 212 may comprise one or more material attributes that include brittle, soft, and fragile. For instance in some non-limiting examples frangible connection may comprise a material having a yield strength no greater than 10 MPa, no greater than 5 Mpa, or no greater than 1 MPa. In some cases, frangible connection may comprise at least one of aluminum, copper, gold, nickel, and/or silver. In some cases, frangible connection 212 may be located substantially within crush zone 216. As described above, crush zone 216 may be located between one or more battery modules and an inner wall of a case 220. Crush zone 216 in some embodiments may be configured to allow room for one or more battery modules to decelerate and lose kinetic energy during an impact, for instance before coming into a collision with case 220 or another large object, such as ground. According to some embodiments, a compressible material 224 may be located between one or more battery modules and case 220. As described above, compressible material 224 may include any material which may absorb and/or dissipate energy as it is compressed. In some cases, a compressible material 224 may comprise one or more of a composite material with voids, and/or a compressible fluid, such as without limitation air or nitrogen. In some cases, compressible material may include an incompressible fluid such as without limitation oil and/or grease. In some cases, compressible material includes a foam or a cellular matrix. In some embodiments, compressible material 224 may be flanked on one or more sides by a composite sheet 228A-B. Composite sheet 228A-B in some cases, may be non-conductive and serve to prevent short circuiting of one or more battery modules. For instance composite sheet 228A-B, in some embodiments, may comprise one or more polymers, such as without limitation polytetrafluoroethylene (PTFE), polyethylene (PE), and the like.

Continuing in reference to FIG. 2, in some embodiments, frangible connection 212 may include a score 232. A score 232 may include any feature intended to structurally weaken frangible connection 212, such as without limitation a notch, a groove, a perforation, a composite bridge (e.g., a soldered connection), and the like. In some cases, a weakening of frangible connection 212 may be configured to contribute to a breaking and disconnection of the frangible connection 212, for instance during an impact or under a predetermined loading condition (i.e., a connection breaking force). Non-limiting exemplary connection breaking force include between about may include forces resulting from decelerations, including impulsive impact derived decelerations, in excess of 4, 12, 20, 50, or 100 G's. In some embodiments, at least a breakaway mount may be configured to release first battery module under a battery breakaway force that is no greater than a connection breaking force.

In some instances a die 236 may be placed near a frangible connection 212, for instance without limitation opposite a score 232. As used in this disclosure, a "die" is a component that is intended to impart deformation forces to another component, such as without limitation a frangible connection. In some cases, a die 236 may be configured to introduce a pressure or an approximated point or line force at a predetermined location along frangible connection 212, for instance between a first battery module 204 and a second battery module 208. In some cases, die may comprise an electrically insulating material, for instance without limitation one or more of a ceramic, a plastic, a coated or composite metal component, a glass, and the like. In some cases, die 236 may be wholly composed of a non-conductive material. Alternatively, in some cases, die 236 may only partially be composed of a non-conductive material; for example, the die may include an aluminum substrate coated with a non-conductive coating, for instance alumina. In some cases, die 236 may be shaped like a wedge with an edge of the wedge directed to contact at or near a score 232 within frangible connection 212. In some embodiments a relief 240 may be located near frangible connection 212. As used in this disclosure, a "relief" is an area or volume that is substantially free from material and thereby provides space for other components or portions of components to occupy, such as without limitation a deformed frangible connection. Relief 240 may allow room for deformation of frangible connection 212, for example during a crash. Relief 240 may be located proximal to a side of frangible connection that is opposite die. In some cases, at least a profile 244A-B may aid in controlled breaking of frangible connection 212. For instance, in a non-limiting example, at least a profile 244A-B may include one or more of a radii or a chamfer configured to impart a load (e.g., bending moment, shear force, and the like) upon frangible connection 212 in certain circumstances. In some embodiments, die 236 may be configured not only to break or disconnect frangible connection 212, but may also be configured to separate two or more resulting portions of frangible connection from one another once separated.

Figure 3:
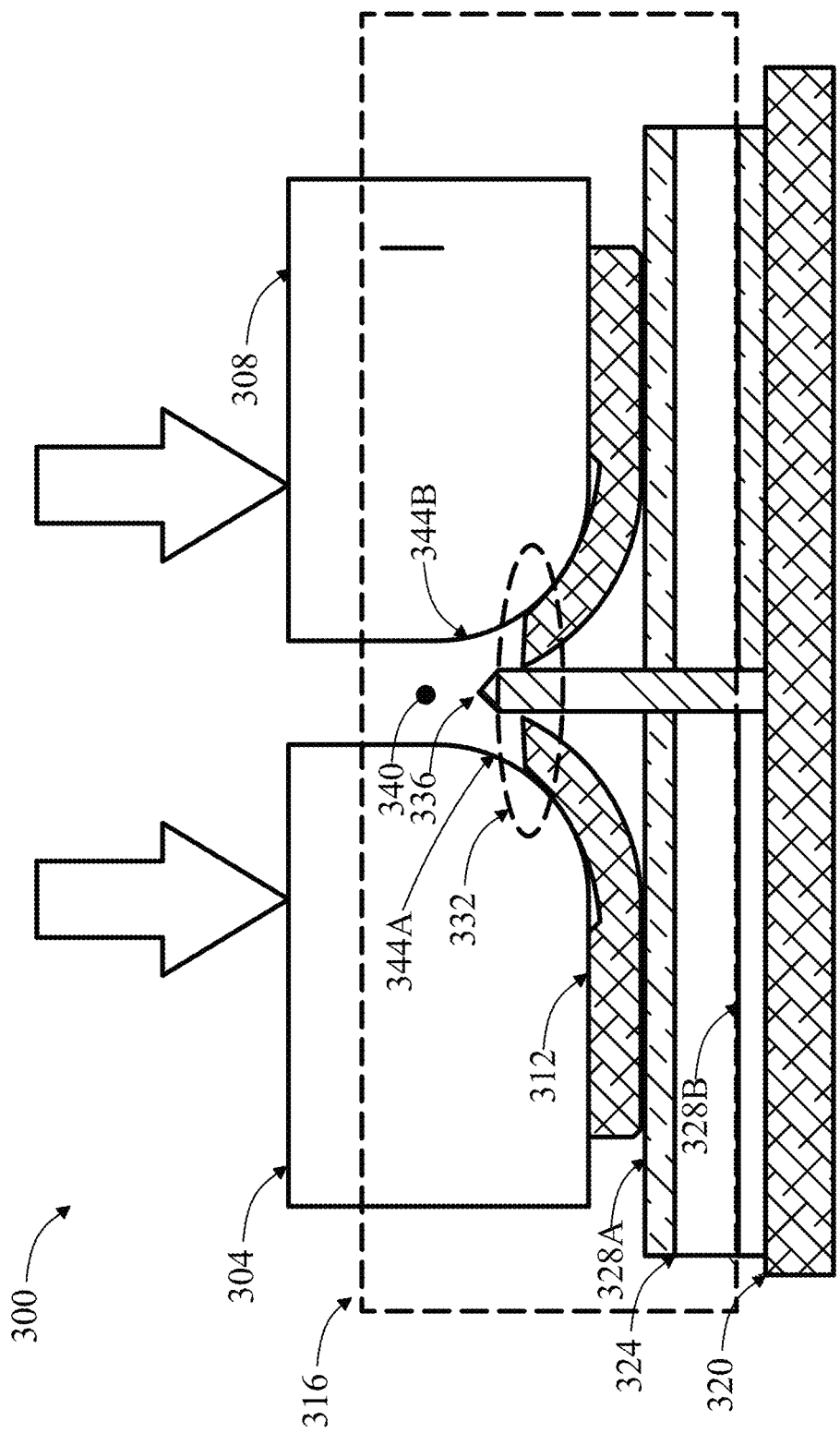
FIG. 3 is a schematic diagram of an exemplary frangible connection in a broken state.

Referring now to FIG. 3, an exemplary frangible connection mechanism 300 is schematically shown after frangible connection has been broken and disconnected. A first battery module 304 is shown in electrical isolation with a second battery module 308, where electrical isolation is provided by way of a frangible connection 312 (i.e., frangible bus). FIG. 3 shows both first battery module 304 and second battery module 308 have encroached a crush zone 316 located between the first battery module 304, the second battery module 308 and an inner wall of a case 320. According to some embodiments, a compressible material 324 may be located between one or more battery modules and case 320. As a result of battery modules entering crush zone, compressible material 324 may compress, thereby absorbing and/or dissipating energy as it is compressed. In some embodiments, compressible material 324 may be flanked on one or more sides by a composite sheet 328A-B. Composite sheet 328A-B, in some cases, may be non-conductive and serve to prevent short circuiting of one or more battery modules.

Continuing in reference to FIG. 3, in some embodiments, frangible connection 312 in a broken state may include a discontinuity 332. A discontinuity 332 may occur along any point on frangible connection 312, between first battery module 304 and second battery module 308. In some cases, discontinuity 336 may occur where a score or another weakening feature is present on an intact frangible connection. In some cases, a weakening of frangible connection may be configured to contribute to a forming of a discontinuity 332 and disconnection of the frangible connection 312, for instance during an impact or under a predetermined loading condition. In some instances a die 336 may be placed to aid in forming discontinuity 332. For instance, a die 336 placed near a frangible connection 312, may under predetermined conditions impart one or more of a pressure, an approximated point force, and/or an approximated line force, thereby forming a discontinuity 332. As described above, in some cases, die 336 may comprise an electrically insulating material, so that after forming discontinuity 332 within frangible connection 312, resulting two or more constituents of the frangible connection 312 remain electrically isolated from one another by the die 336. In some cases, die 336 may be shaped like a wedge with an edge of the wedge directed to contact at or near a score 332 within frangible connection 312. In some embodiments a relief 340 may be located near frangible connection 312. Relief 340 may allow room for deformation of frangible connection 312, for example during a crash. In some cases, at least a profile 344A-B may aid in controlled breaking of frangible connection 212. For instance, in a non-limiting example, at least a profile 344A-B may include one or more of a radii or a chamfer configured to impart a load (e.g., bending moment, shear force, and the like) upon frangible connection 312 in certain circumstances. According to some embodiments, battery pack may be configured to fail safe when impact occurs in a predetermine direction.

Figure 4:
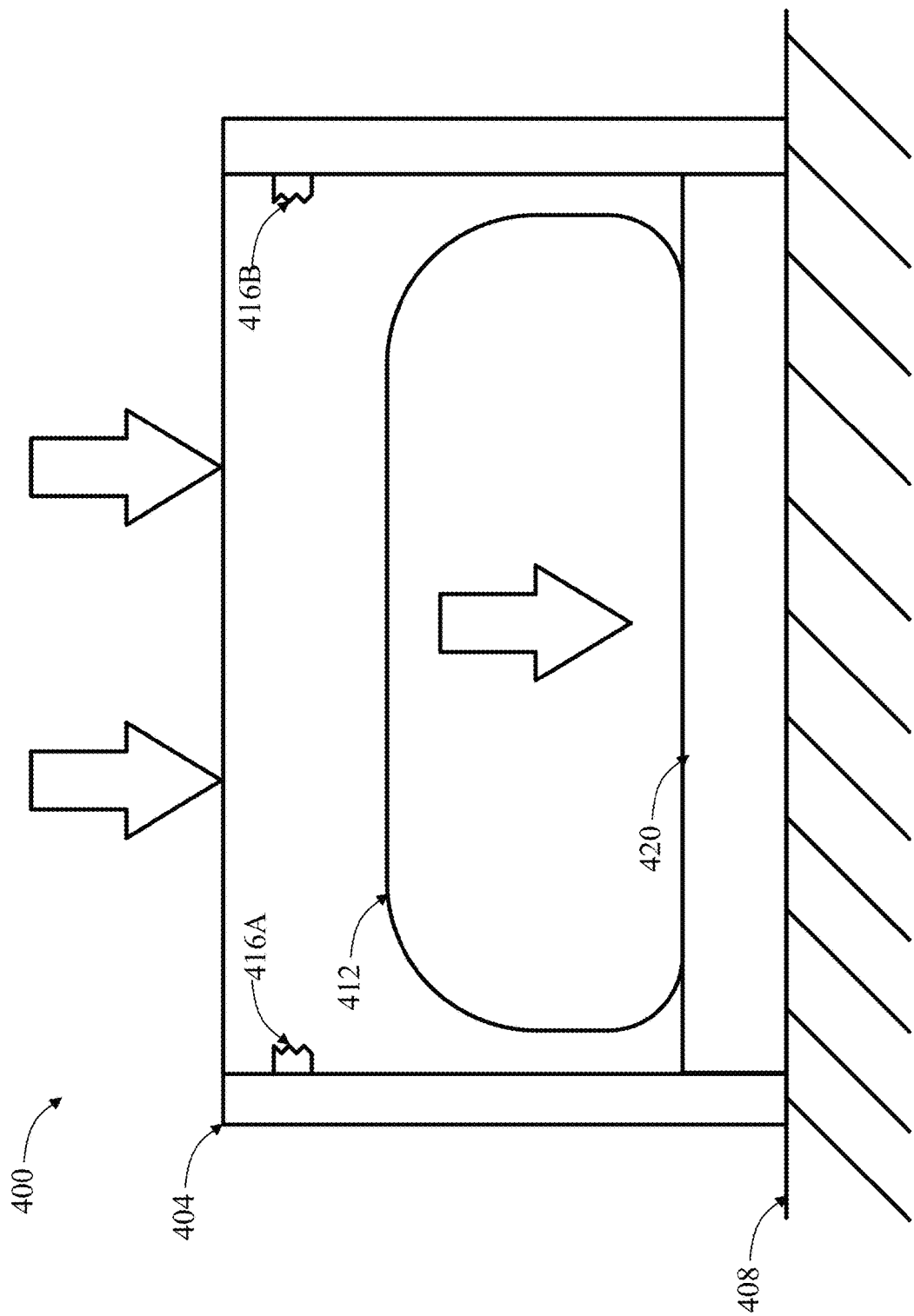
FIG. 4 is a schematic diagram of an exemplary crash safe battery pack undergoing an impact.

Referring now to FIG. 4, a schematic of an exemplary impact 400 is shown. In some cases, a battery pack 404 may predictably crash or impact an object 408, for instance ground, in a predictable manner. For example, in some cases, battery pack may be used on a vertical take-off and landing aircraft and may impact between aircraft and ground may occur predictably substantially along a vertical axis. In some cases battery pack may additionally include one more breakaway mounts for attaching battery pack to a vehicle, such that during an impact of sufficient force the battery pack 404 itself is detached from the vehicle. Alternatively or additionally, in some cases battery pack 404 may include at least a battery module 412 that is attached to the battery pack 404 by one or more breakaway mounts 416A-B. In some cases, breakaway mounts 416A-B may be configured to disconnect when an impact of a sufficient force occurs substantially in a predetermined direction, for instance as shown in FIG. 4. When battery module 412 becomes dislodged from battery pack 404 it may travel toward an ultimately into a crush zone 420. As described above, crush zone may include a compressible material and/or a frangible connection.

Figure 5:
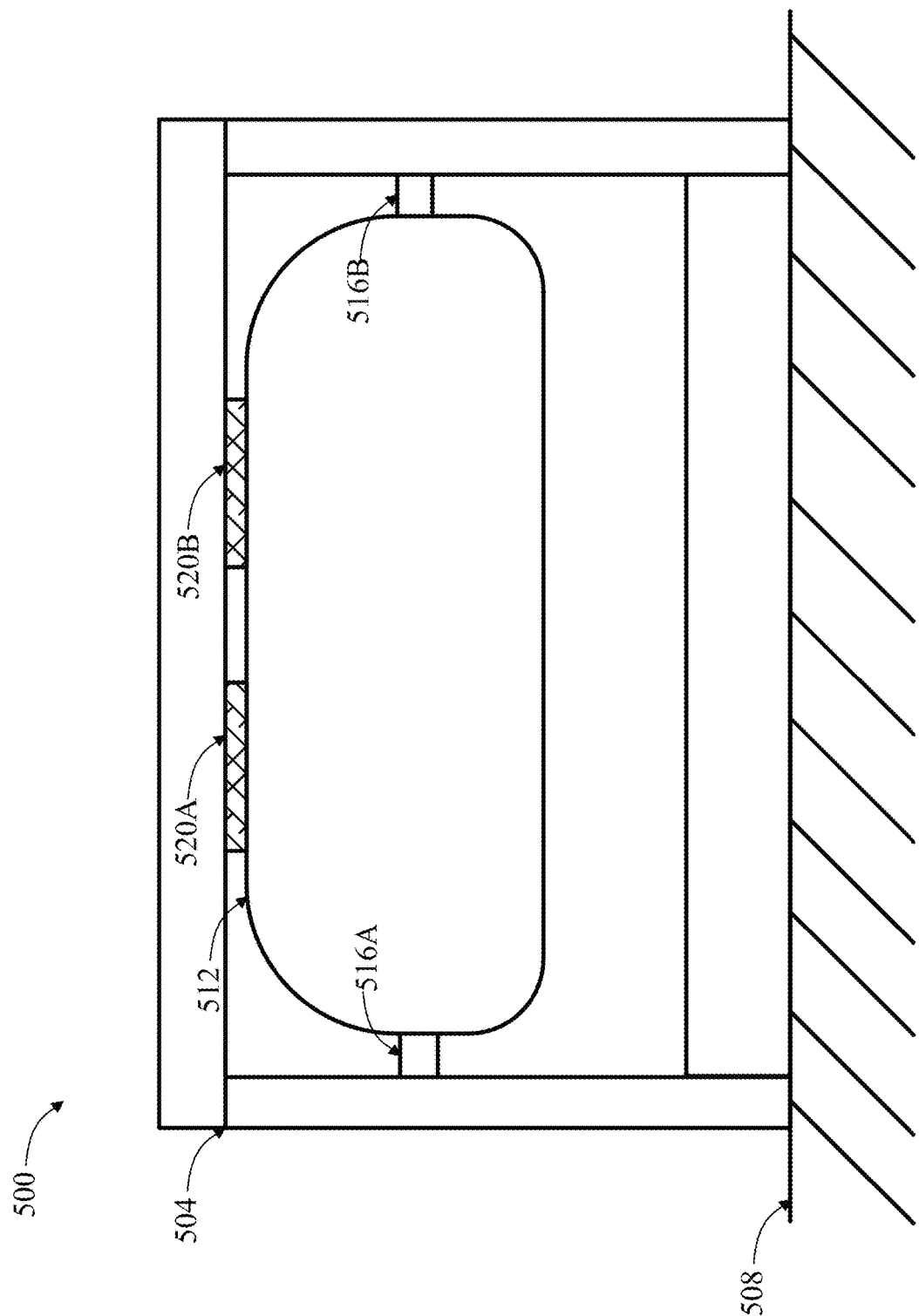
FIG. 5 is a schematic diagram of another exemplary crash safe battery pack.

Referring now to FIG. 5, a schematic of another exemplary system 500 is shown. In some cases, a battery pack 504 may predictably crash or impact an object 508, for instance ground, in a predictable manner. For example, in some cases, battery pack 504 may be used on a vertical take-off and landing aircraft and may impact between aircraft and ground 508 may occur predictably substantially along a vertical axis. In some cases battery pack 504 may additionally include one more breakaway mounts for attaching battery pack to a vehicle, such that during an impact of sufficient force the battery pack 504 itself is detached from the vehicle. Alternatively or additionally, in some cases battery pack 504 may include at least a battery module 512 that is attached to the battery pack 504 by one or more breakaway mounts 516A-B. In some cases, breakaway mounts 516A-B may be configured to disconnect when an impact of a sufficient force occurs substantially in a predetermined direction, for instance as shown in FIG. 5. In some cases, a frangible connection may be disposed substantially outside of a crush zone. For example, as shown in FIG. 5, at least a frangible connection 520A-B may be located opposite a direction battery module 512 may travel in a crash causing breakaway mounts 516A-B to release. When battery module 512 becomes dislodged from battery pack 504 it may travel toward away from at least a frangible connection 520A-B, causing an electrical disconnection between the battery module 512 and the at least a frangible connection 520A-B.

Figure 6:
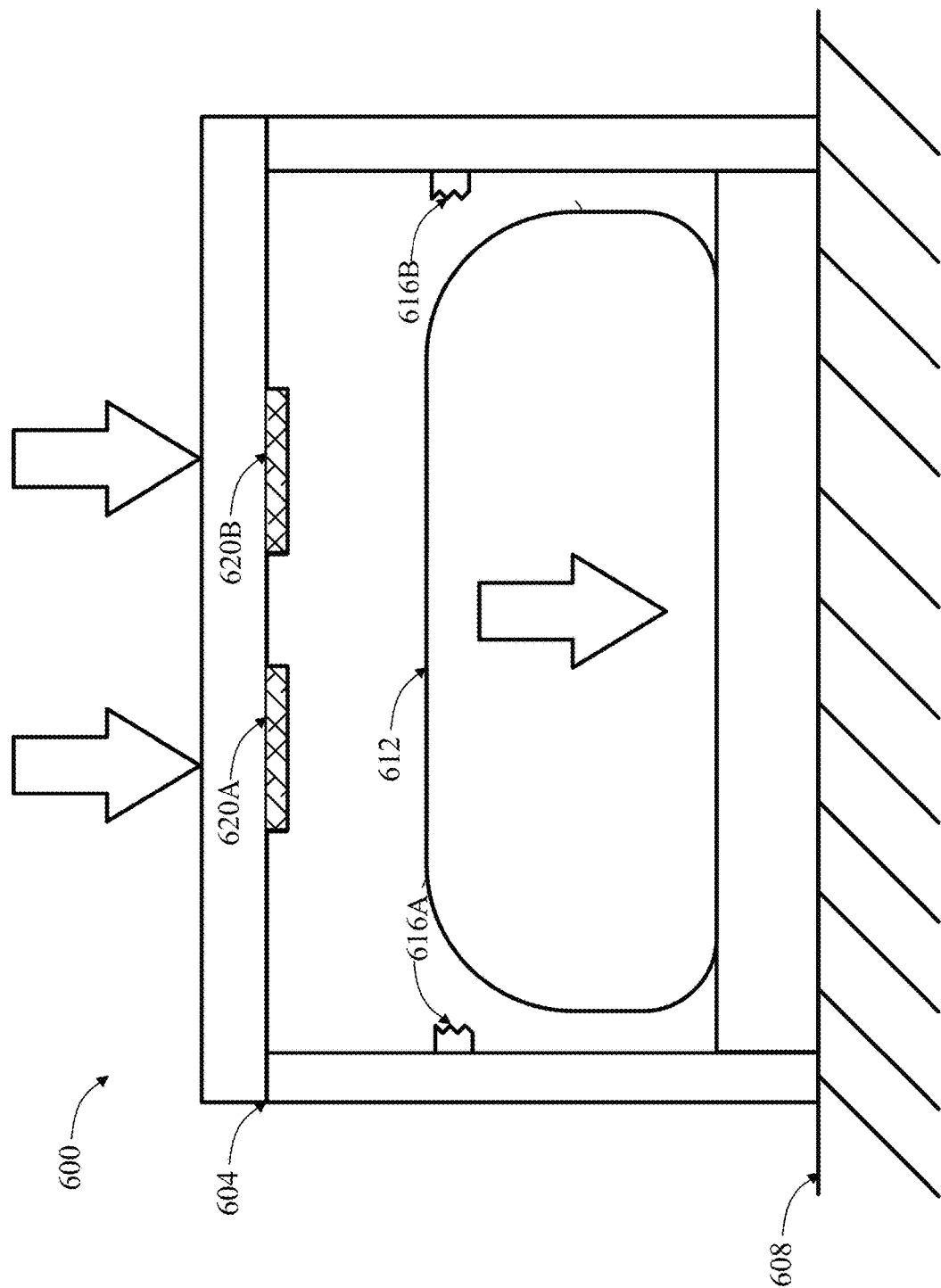
FIG. 6 is a schematic diagram of another exemplary crash safe battery pack undergoing an impact.

Referring now to FIG. 6, a schematic of an exemplary impact 600 involving exemplary system of FIG. 5 is shown. In some cases, a battery pack 604 may predictably crash or impact an object 608, for instance ground, in a predictable manner. For example, in some cases, battery pack may be used on a vertical take-off and landing aircraft and may impact between aircraft and ground may occur predictably substantially along a vertical axis. In some cases battery pack may additionally include one more breakaway mounts for attaching battery pack to a vehicle, such that during an impact of sufficient force the battery pack 604 itself is detached from the vehicle. Alternatively or additionally, in some cases battery pack 604 may include at least a battery module 612 that is attached to the battery pack 604 by one or more breakaway mounts 616A-B. In some cases, breakaway mounts 616A-B may be configured to disconnect when an impact of a sufficient force occurs substantially in a predetermined direction, for instance as shown in FIG. 6. When battery module 612 becomes dislodged from battery pack 604 it may travel away from at least a frangible connection 620A-B, thereby breaking an electrical connection between the at least a frangible connection 620A-B and the battery module 612. In some cases, at least a frangible connection 620A-B may additionally include one or more breakaway mounts 616A-B.

Figure 7:
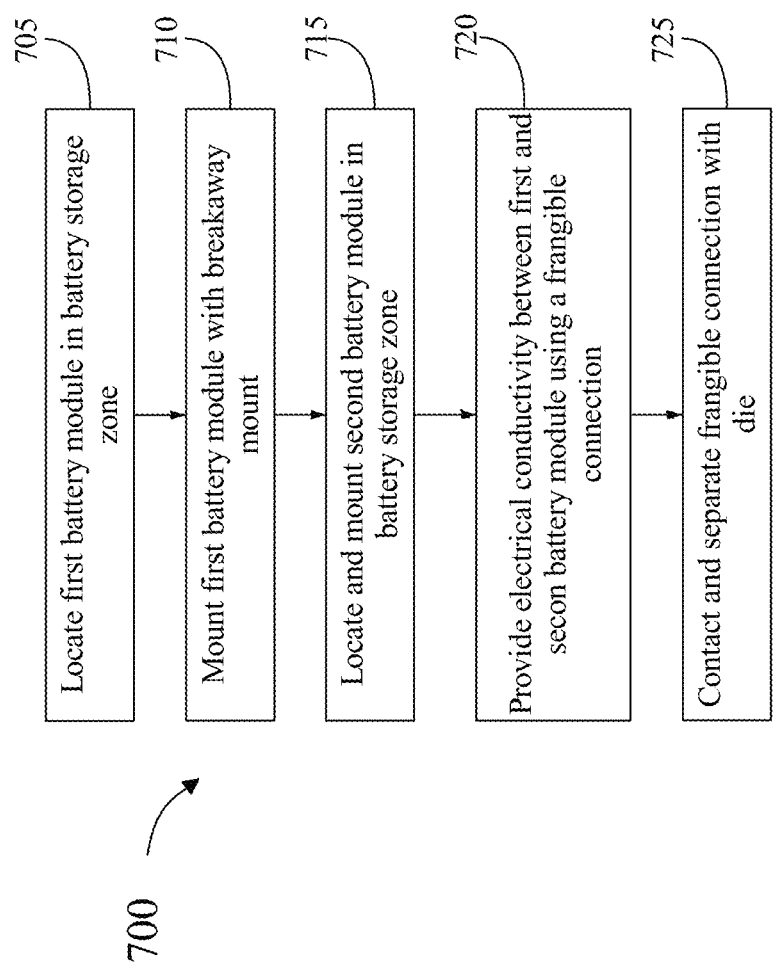
FIG. 7 is a flow diagram illustrating an exemplary method of assembly for an exemplary crash safe battery pack.

Referring now to FIG. 7, a flow diagram illustrates a method 700 of use for a crash safe battery pack. At step 705, first battery module is located within a battery storage zone of a case, which has both the battery storage zone and a crush zone. First battery module may include any battery module or battery cell described throughout this disclosure, for example with reference to FIGS. 1-6. Case may include any case, frame, or structure described throughout this disclosure, for example with reference to FIGS. 1-6. Battery storage zone may include any area within a battery pack inside which a battery module may be stored as described throughout this application, for example with reference to FIGS. 1-6. Crush zone may include any crush zone described throughout this disclosure, for example with reference to FIGS. 1-6.

Continuing in reference to FIG. 7, at step 710, first battery module may be mounted to case with at least a breakaway mount. Breakaway mount may include any breakaway mount as described in this application, for example in reference to FIGS. 1-6.

Continuing in reference to FIG. 7, at step 715, a second battery module may be located and mounted within a battery storage zone of case. Second battery module may include any battery module or battery cell described throughout this disclosure, for example with reference to FIGS. 1-6.

Continuing in reference to FIG. 7, at step 720, electrical conductivity is provided between first battery module and second battery module, using a frangible connection. In some cases, frangible connection may be located substantially within a crush zone of case. Frangible connection may include any frangible connection described within the disclosure, for example in reference to FIGS. 1-6. In some cases, frangible connection may have a score located between first battery module and second battery module. Score may include any score described throughout this disclosure, for example with reference to FIGS. 1-6. In some embodiments, frangible connection may additionally include an electrical material having a yield strength no greater than 5 MPa. In some embodiments, frangible connection may additionally include aluminum.

Continuing in reference to FIG. 7, at step 725, frangible connection may be contacted and separated, using a die, when battery pack is impacted with a sufficiently great connection breaking force. In some cases, die may be located substantially within crush zone of case. Die may include any die as described in this disclosure, for example in reference to FIGS. 1-6. In some embodiments, die may additionally include a wedge. In some embodiments, die may additionally include a non-conductive material.

Still referring to FIG. 7, in some embodiments method 700 may additionally include breaking and electrically isolating frangible connection using die.

Still referring to FIG. 7, in some embodiments, battery pack additionally includes a compressible material located within crush zone between an inner wall of case and first battery module. Compressible material may include any compressible material described within this disclosure, for example in reference to FIGS. 1-6.

Still referring to FIG. 7, in some embodiments, method 700 additionally includes releasing first battery module using at least a breakaway mount when crash safe battery pack is impacted with a battery breakaway force that is no greater than sufficiently great connection breaking force.

Still referring to FIG. 7, in some embodiments, method 700 additionally includes contacting and separating, using die, frangible connection at a first side of the frangible connection, and crash safe battery pack additionally includes a relief located substantially about score at a second side of the frangible connection, where the second side of the frangible connection is opposite the first side of the frangible connection. In some versions, relief may comprise a profile configured to aid in separating frangible connection.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A crash safe battery pack comprising:
   a case having a battery storage zone and a crush zone;
   a first battery module located within the battery storage zone of the case and mounted to the case with at least a breakaway mount;
   a second battery module located within the battery storage zone of the case and mounted to the case;
   a frangible connection located substantially within the crush zone between the first battery module and the second battery modules and configured to provide electrical conduction between the first battery module and the second battery module; and
   a die located substantially within the crush zone and configured to contact and separate the frangible connection when the crash safe battery pack is impacted with a sufficiently great connection breaking force.

2. The crash safe battery pack of claim 1, wherein the die further comprises a wedge.

3. The crash safe battery pack of claim 1, wherein the die further comprises a non-conductive material.

4. The crash safe battery pack of claim 1, wherein the die is further configured to break and electrically isolate the frangible connection.

5. The crash safe battery pack of claim 1, further comprising a compressible material located within the crush zone between an inner wall of the case and the first battery module.

6. The crash safe battery pack of claim 1, wherein the frangible connection further comprises an electrical material having a yield strength no greater than 5 MPa.

7. The crash safe battery pack of claim 6, wherein the frangible connection further comprises aluminum.

8. The crash safe battery pack of claim 1, wherein the at least a breakaway mount is configured to release the first battery with a battery breakaway force that is no greater than the sufficiently great connection breaking force.

9. The crash safe battery pack of claim 1, wherein the die is further configured to:
   contact and separate the frangible connection at a first side of the frangible connection; and
   the crash safe battery pack further comprises a relief located substantially about a score at a second side of the frangible connection, wherein the second side of the frangible connection is opposite the first side of the frangible connection.

10. The crash safe battery pack of claim 9, wherein the relief comprises a profile configured to aid in separating the frangible connection.

11. The crash safe battery pack of claim 1, wherein the frangible connection further comprises:
    a score located between the first battery module and the second battery module; and
    wherein the die is further configured to contact and separate the frangible connection at the score.

* * * * *